United States Patent [19]

Werner

[11] 4,098,135

[45] Jul. 4, 1978

[54] FREE WHEELING DRIVE ARRANGEMENT FOR A TURNABLE MEMBER, ESPECIALLY FOR ADJUSTING THE POSITION OF BACKRESTS OR WINDOW PANES IN AUTOMOTIVE VEHICLES

[75] Inventor: Paul Werner, Remscheid-Hasten, Fed. Rep. of Germany

[73] Assignee: Keiper K.G., Remscheid-Rasten, Fed. Rep. of Germany

[21] Appl. No.: 686,956

[22] Filed: May 17, 1976

[30] Foreign Application Priority Data

Jun. 12, 1975 [DE] Fed. Rep. of Germany ....... 2526149

[51] Int. Cl.² ............................................. F16H 27/00
[52] U.S. Cl. ..................................................... 74/157
[58] Field of Search ................. 74/142, 145, 146, 157, 74/473 R, 476

[56] References Cited

U.S. PATENT DOCUMENTS

| 91,072 | 6/1869 | Bean | 74/146 |
|---|---|---|---|
| 936,640 | 10/1909 | Knowles | 74/146 |
| 1,161,943 | 11/1915 | Machek | 74/146 |

FOREIGN PATENT DOCUMENTS 519,012   3/1940   United Kingdom ................... 74/157

Primary Examiner—Samuel Feinberg
Attorney, Agent, or Firm—Michael J. Striker

[57] ABSTRACT

A free wheel drive arrangement for a turnable member, especially for adjusting the position of backrests or window panes in automotive vehicles, includes a carrier arm tiltable about the axis of a circular adjusting member and a driving arm eccentrically mounted on the carrier arm for tilting movement with respect thereto between an active position, engaging the turnable member to turn the latter about its axis during turning of the driving arm with said carrier arm in one direction, and a free wheeling position, in which the driving arm is disengaged from the turnable member during turning of the driving arm with the carrier arm in a direction opposite to the one direction. Cooperating abutment means on the driving arm and the carrier arm maintain the driving arm in the free wheeling position during turning of the driving arm with the carrier arm in this opposite direction.

10 Claims, 6 Drawing Figures

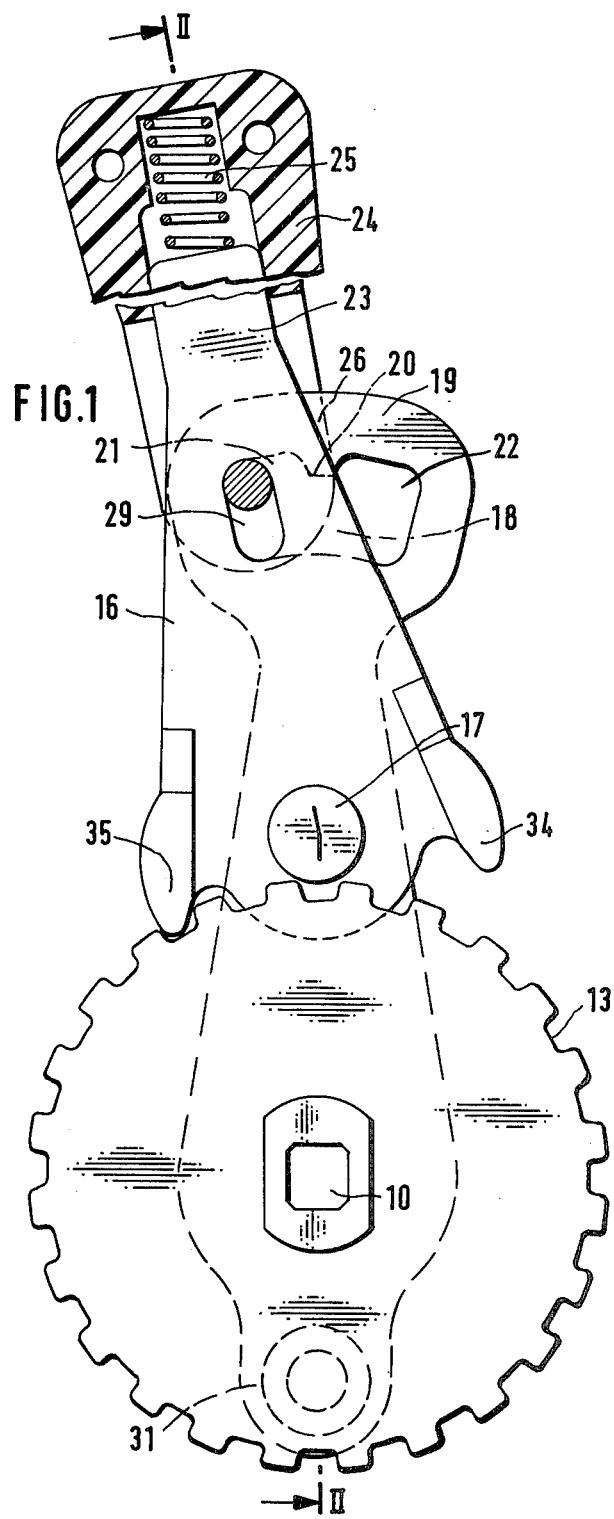
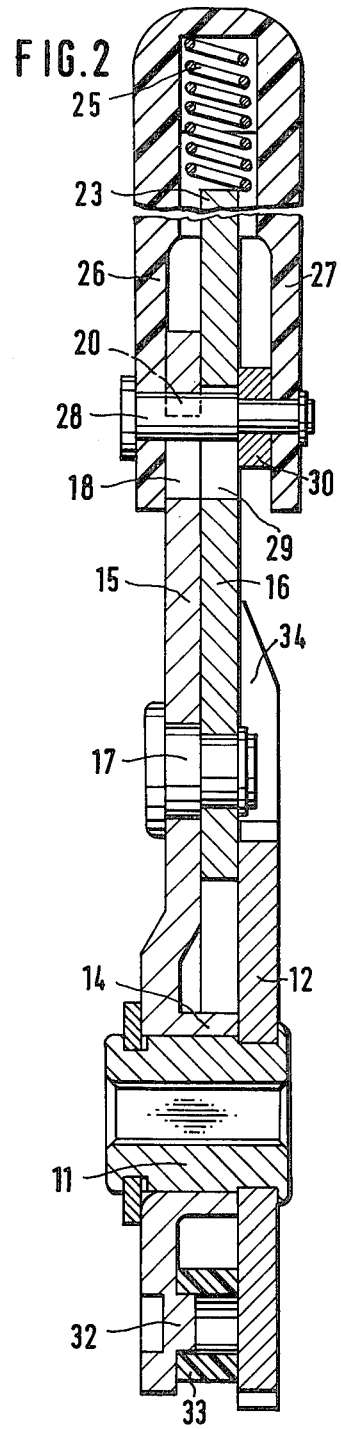

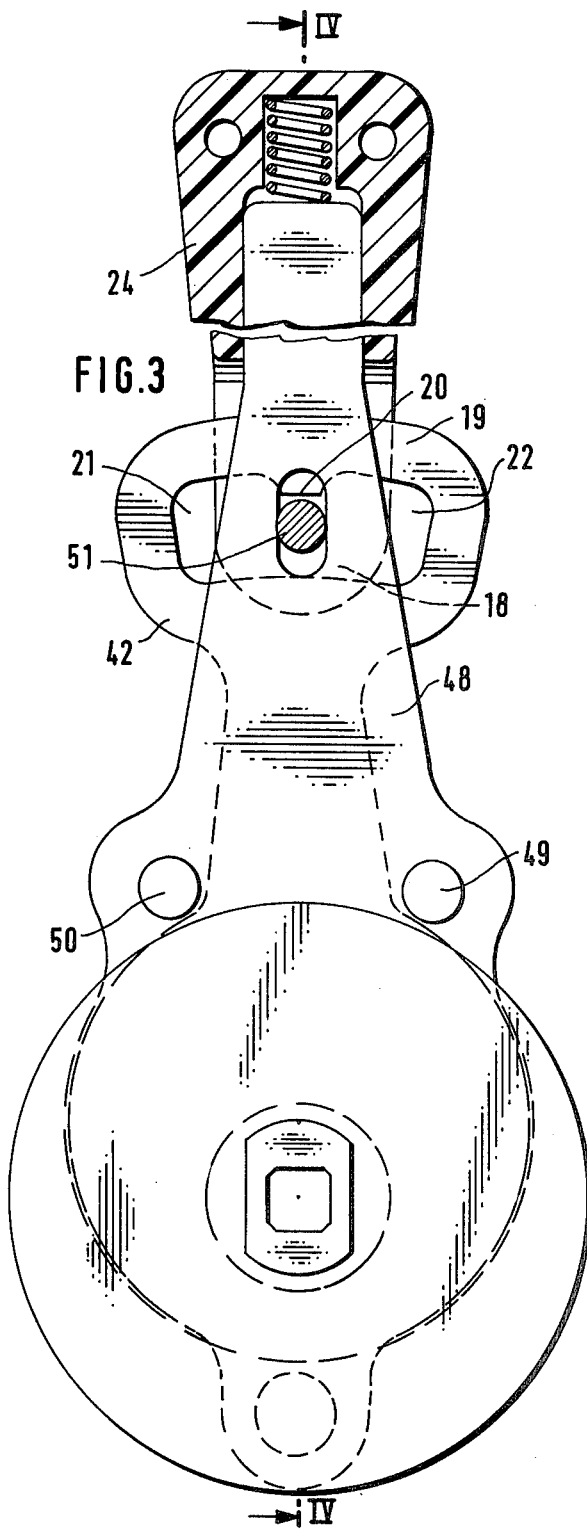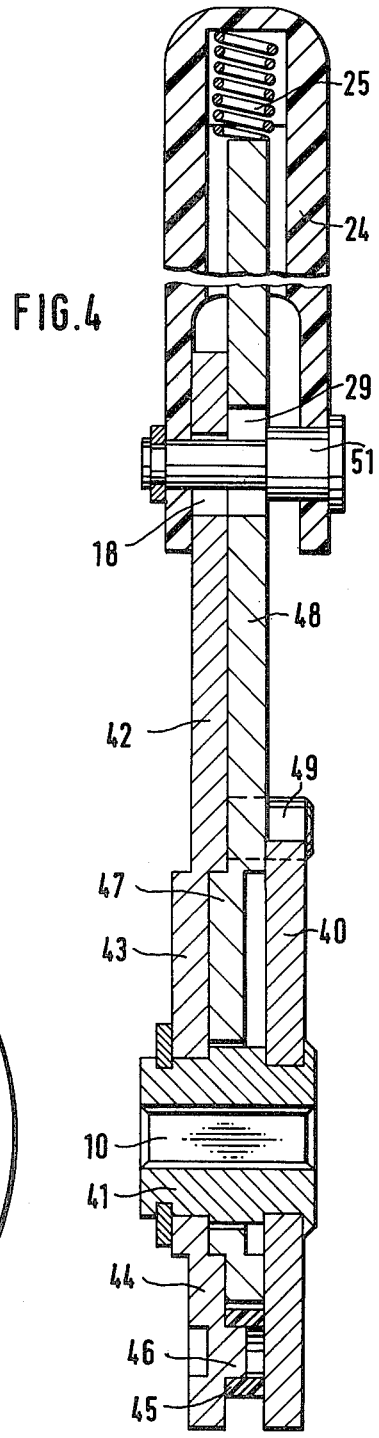

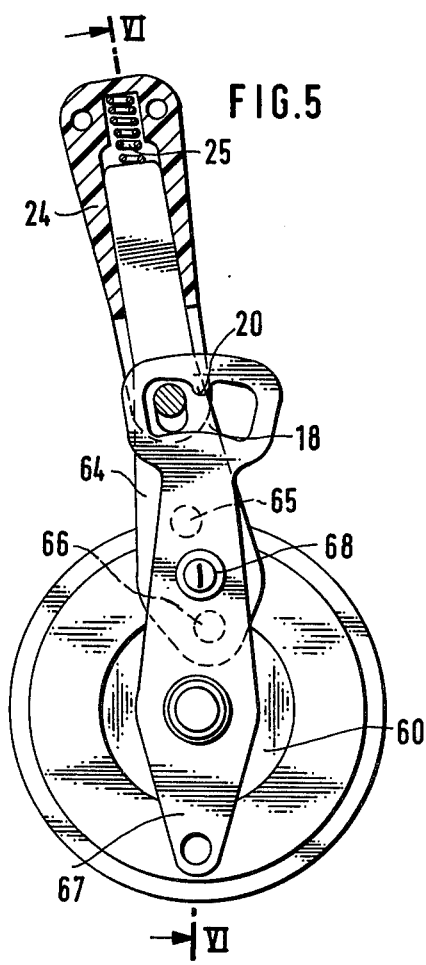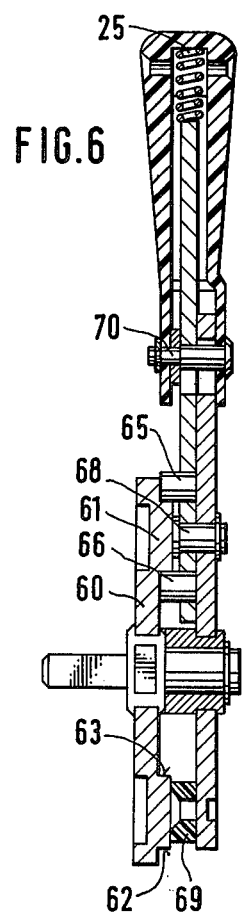

FREE WHEELING DRIVE ARRANGEMENT FOR A TURNABLE MEMBER, ESPECIALLY FOR ADJUSTING THE POSITION OF BACKRESTS OR WINDOW PANES IN AUTOMOTIVE VEHICLES

BACKGROUND OF THE INVENTION

The present invention relates especially to drives, for instance for backrests or window panes of automotive vehicles, in which a reciprocatably tiltable driving arm is to be coupled with a turnable adjusting member during tilting movement of the driving arm in one direction and in which the driving arm free wheels with respect to the adjusting member during tilting of the arm in the opposite direction.

The German Auslegeschrift No. 1,142,767 discloses an articulated mount for motor vehicle seats in which the inclination of the backrest relative to the seat part is adjustable by a threaded spindle arrangement which may be driven in a selective direction over a free wheeling arrangement. The free wheeling drive comprises a gear serving as the adjustable member and a double pawl tiltably mounted on a driving arm, which in turn is mounted tiltable about the axis of the adjustable member, in which the double pawl is held by a compression spring in one or in another position in which it takes the adjustable member along in one or the other direction during tilting of the driving arm. The adjustment of the double pawl to one or the other position is carried out by means of a linkage which is actuated by means of a grip member, shiftably mounted on the driving arm. In arrangements of this kind a ratching noise will result during the idle stroke of the driving arm which is caused during movement of the pawl over the teeth of the adjustable member.

The same disadvantages are inherent in an actuating device for a hinge fitting in an automotive vehicle as disclosed in the German Pat. No. 1,925,778, in which during movement of the driving arm in one or the other direction only half of the available tilting angle of the driving arm is used. This construction is likewise provided with a tiltable pawl on the driving arm, which, during the idle stroke of the latter, ratches over the teeth of the adjustable member.

SUMMARY OF THE INVENTION

It is an object of the present invention to provide a free wheeling drive of the aforementioned kind in which the available tilting angle for the driving arm may be used to an optimum extent, while disturbing noises during use of the arrangement are avoided.

With these and other objects in view, which will become apparent as the description proceeds, the arrangement according to the present invention mainly comprises a carrier arm tiltable about the axis of a turnable adjusting member, a driving arm eccentrically mounted on the carrier arm for tilting movement with respect thereto between an active position, in which the driving arm is tilted in one direction relative to the carrier arm to thereby engage the adjusting member and turn the latter about its axis during turning of the driving arm and the carrier arm in said one direction, and a free wheeling position in which the driving arm is tilted in the opposite direction relative to the carrier arm and disengaged from the adjusting member, and cooperating means on the carrier arm and the driving arm for maintaining the latter in the free wheeling position during tilting of the driving arm in the opposite direction relative to the carrier arm, and turning of the driving arm with the carrier arm in said opposite direction.

In this arrangement only a small part of the total tilting range of the driving arm is used to bring the latter during reversal of the movement in engagement, respectively out of engagement, with the adjustable member. During the idle stroke of the driving arm, the further advantage is derived that no ratching noises will result. This arrangement has the additional advantage to assure a reliable engagement between driving arm and the adjustable member in the active position of the driving arm, without requiring close tolerances for the various elements of the arrangement. In addition, the arrangement will automatically adjust itself to compensate for eventual wear of the engaging elements.

This basic idea of the invention can be carried out in various different ways. Especially for drives which are to be selectively operated in one or the other turning direction, it is advantageous that the cooperating means, mentioned above, comprise abutment means on the carrier arm and forming two tilting zones to opposite sides of the abutment means, and means connected to the driving arm and placeable at the will of the operator in either of the tilting zones, for selecting the direction at which the driver arm has to be tilted relative to the carrier arm in order to be in active position. The abutment means on the carrier arm may be in the form of a cam and the means connected to the driving arm may comprise an abutment member adapted to abut against either side of the cam. The arrangement may include a gripping member carrying the abutment member and mounted on the driving arm to be movable at the will of the operator over the cam to either side of the latter. In order to change the driving direction it is only necessary to move the gripping member relative to the driving arm in order to move the abutment member on the gripping member over the cam into the respective tilting zone to opposite sides of the cam. The cam forming the abutment member is preferably in the form of a projection provided midways in a transverse opening in the region of one end of the carrier arm and directed towards the turning axis of the adjustable member. The gripping member is preferably spring-biased for maintaining the abutment member thereon in engagement with the cam during tilting of the driving arm to the free wheeling position.

The elements driving the adjustable member may also be constructed in various different ways. In a simple construction the driving arm comprises at least one tooth adapted to engage between the teeth of a gear rim provided on the outer periphery of the adjusting member. If the arrangement should be useable for two selectable drive directions, then the driving arm is provided with two teeth of which one or the other will engage the teeth on the gear rim when the driving arm is in the active position. Instead of a positive engagement between the driving arm and the adjustable member, it is also possible to provide a frictional engagement between these two elements, in which the high friction pressure resulting from the eccentric mounting of the driving arm on the carrier arm may be used. In such an arrangement the gripping arm is provided with at least one pressure pin arranged for frictional engagement with a cylindrical surface of the adjustable member. Two pressure pins are to be provided on the driving arm, if the drive direction for the adjustable member is to be selectable in one or the other direction.

In a further modification according to the present invention, two pressure pins are provided on the driving arm which simultaneously frictionally engage inner and outer cylindrical surfaces on the adjustable member. In this arrangement it is advantageous to provide, in the bearing connecting the driving arm with the carrier arm, a certain clearance in order to assure a secure engagement between the two pressure pins with the inner and outer cylindrical surfaces on the adjustable member, even if the various elements of this construction are manufactured at relatively large tolerances.

The mounting of the driving arm on the carrier arm may be carried out in different ways. In a simple arrangement the two arms abut with flat surfaces against each other and are connected by a pivot pin for pivotal movement with respect to each other, while holding the flat surfaces in engagement with each other. On the other hand, one of the arms may be formed with a cavity having an inner cylindrical, peripheral surface arranged eccentrically with respect to the axis of the adjustable member, and the other arm may be provided with a projection located in the aforementioned cavity and having an outer cylindrical surface engaging and guided by the inner cylindrical surface of the cavity, to thereby connect the arms for tilting movement relative to each other.

The aforementioned gripping member with the abutment member thereon may encompass an end portion of the driving arm to be guided on the latter for movement in longitudinal direction, which will result in a pleasant appearance and an easy, foolproof operation of the abutment member. Instead of mounting the abutment member on a movable gripping member it is also possible to provide the gripping arm with two alternatively engageable abutment members.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a partly sectioned side view of one arrangement according to the present invention;

FIG. 2 is a cross-section taken along the line II—II of FIG. 1;

FIG. 3 is a partly sectioned side view of another embodiment according to the present invention;

FIG. 4 is a cross-section taken along the lines IV—IV of FIG. 3;

FIG. 5 is a partly sectioned side view of a further embodiment according to the present invention; and FIG. 6 is a cross-section taken along the line VI—VI of FIG. 5.

DESCRIPTION OF THE PREFERRED EMBODIMENTS

In the first embodiment, shown in FIGS. 1 and 2, a substantially circular adjusting member 12, provided at its peripheral surface with a gear rim 13, has a hub 11 formed with a non-circular axial opening. The hub 11 is to be mounted on the drive shaft of a gear unit, not shown in the drawing, serving for instance to adjust the position of a backrest of a seat in a vehicle or for adjustment of the position of window panes in such a vehicle. A carrier arm 15 is tiltably mounted by means of a collar 14 on the outer cylindrical surface of the hub 11 and fixed in axial position by a split spring washer or the like. A driving arm 16, abutting with a flat side face against a corresponding flat side face of the carrier arm 15, is pivoted on the latter by means of a pivot pin 17, constructed to hold the flat side faces of the two arms in abutment with each other. The pivot pin 17 extends parallel to the axis of the hub 11, but is radially spaced from the latter. The free end portion of the carrier arm 15 is formed with a substantially rectangular opening 18 and an abutment in form of a cam 20 extends midways of the opening inwardly toward the axis of the hub into the opening 18 and divides the latter into two zones 21 and 22 to opposite sides of the central cam 20. A gripping member 24 extends about an end portion 23 of the driving arm 16 and is guided on the end portion 23 for movement in longitudinal direction of the latter. A coil compression spring 25 is sandwiched between the free end of the end portion 23 of the driving arm 16 and the closed end of the gripping member 24, thus biasing the gripping member 24 in a direction away from the upper end of the driving arm 16. The portion of the gripping member 24 directed toward the adjusting member 12 is fork-shaped and extends over the region of the opening 18 provided in the carrier arm 15. A pin 28, forming an abutment, adapted to cooperate with the cam 20 extends between the legs 26 and 27 of the fork-shaped portion of the gripping member 24 and this pin is guided in an elongated opening 29 provided in the driving arm 16. A spacer, in form of a washer 30, is located about a portion of the pin 28 between the leg 27 and the corresponding side face of the driving arm 16. The carrier arm 15 extends with a portion 31 beyond the hub 11, in direction opposite to the portion of the carrier arm 15 provided with the opening 18, and the portion 31 of the carrier arm is provided with a projection 32, which carries a non-metallic friction bushing 33 engaging the corresponding side face of the adjusting member 12. The driving arm 16 is provided, at its end facing the adjusting member 12, with a pair of teeth 34 and 35, respectively located to opposite sides of the pivot pin 17 and offset from the general plane of the driving arm 16, for cooperation with the teeth on the gear rim 13 of the adjusting member 12.

The above described arrangement is operated as follows:

If the driving arm 16 is tilted in counterclockwise direction from the position shown in FIG. 1, the tooth 35 thereon in engagement with the teeth of the gear rim 13 of the adjusting member will turn the latter likewise in counterclockwise direction. During such turning the carrier arm 15 will turn with the driving arm 16 in the same direction due to the connection of the two arms by the pivot pin 17 and the pin 28 which, during such tilting, will abut against the left side face of the opening 18 in the carrier arm. During return tilting of the driving arm 16, that is during tilting of the same in clockwise direction, the carrier arm 15 will not follow immediately this movement, due to the braking of the carrier arm by the friction bushing 33, so that the driving arm 16 with its gripping member 24 will move relative to the carrier arm 15 until the pin 28 will abut against the left flange, as viewed in FIG. 1, of the cam 20. During the relative movement of the arms 15 and 16 with respect to each other, the tooth 35 will be lifted out of engagement with the gear rim 13, so that the tooth 35 during further common tilting movement of the arms 15 and 16, in clockwise direction, will move over a corresponding portion of the gear rim 13 out of engagement with the latter. During this movement, the carrier arm 15 is taken along with the driving arm 16, due to the engagement of the pin 28 with the left side face of the cam 20. During renewed tilting of the arms 15 and 16 in counterclockwise direction the driving arm 16 with the gripping member 25 will first move relative to the carrier arm 15, until the tooth 35 will again engage between the teeth of the gear rim 13, and subsequently thereto both arms 15 and 16 will move in this counterclockwise direction while taking along the adjusting member.

If a change in the direction at which the adjusting member 12 has to be turned is desired, then the gripping member 24 is moved against the tension of the spring 25 and the gripping arm 16 together with the gripping member 24 is tilted about the pivot pin 17 relative to the carrier arm 16, whereby the pin 28 will pass the cam 20 to be moved into the region 22 of the opening 18 in the carrier arm 15. After such adjustment, the above described operation will be carried out while the adjusting member will now be turned in clockwise direction during tilting of the arms 15 and 16.

In the embodiment shown in FIGS. 3 and 4, the adjustment member 14 is in the form of a disc 40 having a cylindrical peripheral surface. The disc 40 is fixed on a hub 41 for turning therewith about the axis thereof, whereas the hub 41 is provided with a non-round opening for coupling with a shaft of a drive not shown in the drawing. A carrier arm 42 is tiltably mounted on the outer peripheral surface of the hub 41. A portion 43 of the carrier arm 42 is axially offset to provide a cavity having an inner cylindrical surface and this portion 43 is formed with a bearing bore, eccentrically arranged with respect to the axis of the hub 41, through which the hub extends. An extension of the carrier arm 42, extending beyond the hub 41, is again formed with a projection 46 carrying a friction bushing 45 which frictionally engages the corresponding side face of the disc 40. The carrier arm is axially fixed on the hub 41 by a split spring washer or the like. As in the embodiment shown in FIGS. 1 and 2, the carrier arm 42 is provided in the region of its end portion with an opening 18, extending transverse to the longitudinal direction of the carrier arm 42, and this opening is divided by cam 20, extending from the web 19 into the opening, into substantially equal zones 21 and 22 to opposite sides of the cam 20.

The aforementioned cavity formed in the axial offset portion 43 of the carrier arm 42 forms a flat bearing in which an axially offset cylindrical projection 47 of the driving arm 48 is turnably engaged. The offset portion 47 of the driving arm 48 is provided with a circular opening surrounding the hub 41 with considerable clearance. Two pins 49 and 50 are fixed to the driving arm 48 to opposite sides of a longitudinal plane of symmetry of the latter and projecting therefrom into the region of the periphery of the disc 40. In the position as shown in FIG. 3 both of the pins 49 and 50 are disengaged from the outer peripheral surface of the disc or adjusting member 40. A gripping member 24, of the same construction as that shown in FIG. 1, is mounted on an end portion of the driving arm 48 for movement in longitudinal direction and this gripping member 24 is again biased by a spring 25 in direction away from the adjusting member 40. The gripping member 24 is again fork-shaped, at its portion thereof directed toward the adjusting member 40, with the two legs of the fork-shaped portion extending to opposite sides of the opening 18. A pin or abutment member 51, corresponding to the pin 28 shown in FIG. 1, extends through openings in the legs of the fork-shaped portion of the gripping member 24, through the opening 18 in the carrier arm, and through an elongated opening 29 in the driving arm 48, to be guided in this opening 29.

The embodiment shown in FIGS. 3 and 4 will be operated in substantially the same manner as described above in connection with FIGS. 1 and 2, with the only difference that, instead of a positive engagement of the teeth of the driving arm shown in FIG. 1 with the teeth of the gear rim in this first embodiment, the frictional contact of the pin 49 or 50 with the peripheral surface of the disc 40 is used for transmitting a turning moment between the driving arm 48 and the disc 40. This frictional contact is obtained in that, due to the eccentricity of the axially offset portion 43 and 47, the driving arm 48 will press, during its active stroke, depending on the direction of the tilting, either the pin 49 or 50 against the peripheral surface of the disc 40, whereas during the reverse stroke the pin 51 will cooperate with the cam 20 to cause tilting of the two arms relative to each other to disengage the respective pin from the peripheral surface of the disc 40 and to take the carrier arm along during such return tilting of the driving arm. In this embodiment the outer side faces defining the opening 18 are preferably arranged spaced from each other so that, during the active stroke of the driving arm, the pin 51 will not engage one or the other of the side faces defining the opening 18, to assure an optimal frictional pressure of the pin 49, respectively the pin 50, against the peripheral surface of the disc 40.

In the embodiment shown in FIGS. 5 and 6 the disc-shaped adjusting member 60 is provided with an axially offset annular zone 61 defining an outer cylindrical surface 62 and an inner cylindrical surface 63 coaxial with the axis of the disc 60 and adapted to cooperate with two pins 65 and 66 arranged spaced from each other in a plane of symmetry of the driving arm 64. The driving arm 64 is tiltably mounted on a carrier arm 67 by means of a pivot pin 68 located between the pins 65 and 66. The carrier arm carries at one end thereof a friction bushing 69 engaging a side face of the disc 60 and in the region of the other end the carrier arm 67 is again provided with an opening 18 through which a pin 71 is carried by the legs of the gripping member 24 extends. A cam 20 again extends substantially midways into the opening 18 for cooperation with the pin 70, as described before, and the latter is again guided in an oblong opening provided in the driving arm. As in the previously described embodiment a coil compression spring 25 biases the gripping member 24 away from the disc 60.

In the embodiment shown in FIGS. 5 and 6 the adjusting member or disc 60 is engaged at two points with oppositely directed forces by the pins 65 and 66. This will result in an advantageous friction engagement without imparting undue forces to the tilting connection of the carrier arm 67 with the driving arm 64.

It will be understood that each of the elements described above, or two or more together, may also find a useful application in other types of free wheeling driving arrangements for a turnable member, differing from the types described above.

While the invention has been illustrated and described as embodied in a free wheeling drive arrangement for a turnable member, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A free wheeling drive arrangement for a turnable member, and especially for adjusting the position of a backrest and window panes in automotive vehicles, comprising, in combination, a circular adjusting member turnable about its axis; a carrier arm tiltable about said axis; a driving arm eccentrically mounted on said carrier arm for tilting movement with respect thereto between an active position in which said driving arm is tiltable in one direction relative to the carrier arm to thereby engage the turnable member and turn the latter about its axis by turning the driving arm and thereby the carrier arm in said one direction, and a free wheeling position in which said driving arm is tilted in the opposite direction relative to the carrier arm and disengaged from said turnable adjusting member; and cooperating means on said carrier arm and said driving arm for maintaining the latter in said free wheeling position during tilting of said driving arm in said opposite direction relative to said carrier arm during turning of said driving arm and said carrier arm in said opposite direction, said adjusting member having a cylindrical surface coaxial with said axis, and said driving arm comprising at least one pressure pin fixed thereto in frictional engagement with said cylindrical surface, when said driving arm is in said active position.

2. A free wheeling drive arrangement for a turnable member, and especially for adjusting the position of a backrest and window panes in automotive vehicles, comprising, in combination, a circular adjusting member turnable about its axis; a carrier arm tiltable about said axis; a driving arm eccentrically mounted on said carrier arm for tilting movement with respect thereto between an active position in which said driving arm is tiltable in one direction relative to the carrier arm to thereby engage the turnable member and turn the latter about its axis by turning the driving arm and thereby the carrier arm in said one direction, and a free wheeling position in which said driving arm is tilted in the opposite direction relative to the carrier arm and disengaged from said turnable adjusting member; and cooperating means on said carrier arm and said driving arm for maintaining the latter in said free wheeling position during tilting of said driving arm in said opposite direction relative to said carrier arm during turning of said driving arm and said carrier arm in said opposite direction, said adjusting member having an outer and an inner cylindrical surface radially spaced from each other and coaxial with said axis, and said driving arm having two pressure pins fixed thereto which are in frictional engagement with said inner and outer cylindrical surfaces, respectively, when said driving arm is in said active position.

3. A free wheeling drive arrangement for a turnable member, and especially for adjusting the position of a backrest and window panes in automotive vehicles, comprising, in combination, a circular adjusting member turnable about its axis; a carrier arm tiltable about said axis; a driving arm eccentrically mounted on said carrier arm for tilting movement with respect thereto between an active position in which said driving arm is tiltable in one direction relative to the carrier arm to thereby engage the turnable member and turn the latter about its axis by turning the driving arm and thereby the carrier arm in said one direction, and a free wheeling position in which said driving arm is tilted in the opposite direction relative to the carrier arm and disengaged from said turnable adjusting member; cooperating means on said carrier arm and said driving arm for maintaining the latter in said free wheeling position during tilting of said driving arm in said opposite direction relative to said carrier arm during turning of said driving arm and said carrier arm in said opposite direction; and friction means between said carrier arm and said adjusting member to retard the motion of said carrier arm during tilting of said driving arm in the opposite direction.

4. An arrangement as defined in claim 3, cooperating means comprising a cam on said carrier arm and wherein said means connected to said driving arm comprises an abutment member adapted to abut against said cam, and including a gripping member carrying said abutment member and mounted on said driving arm in such a manner that said abutment member may be moved at the will of the operator over said cam to either side of the latter.

5. An arrangement as defined in claim 3, wherein said cooperating means comprises a cam in the region of one end of said carrier arm, a gripping member mounted on a portion of said driving arm distant from said adjusting member and movable in longitudinal direction of said driving arm, an abutment member carried by said gripping member, and spring means between said gripping member and said driving arm for maintaining said abutment member in engagement with said cam during tilting of said driving arm to said free wheeling position.

6. An arrangement as defined in claim 5, wherein said carrier arm is provided in the region of said one end thereof with an opening extending transverse to the longitudinal region of said carrier arm, said cam being constituted by a projection extending into said opening substantially midways between opposite ends of the latter, said projection being directed towards the axis of said adjusting member.

7. An arrangement as defined in claim 5, wherein said gripping member with said abutment member thereon encompasses an end portion of the driving arm to be guided on the latter for movement in longitudinal direction thereof.

8. An arrangement as defined in claim 3, wherein said adjusting member is provided at its outer periphery with a gear rim, and wherein said driving arm comprises at least one tooth adapted to engage between the teeth of said gear rim, when said driving arm is in said active position.

9. An arrangement as defined in claim 3, wherein said carrying arm and said driving arm have flat surfaces abutting against each other and including a pivot pin connecting said carrier arm and said driving arm for pivotal movement with respect to each other while holding said flat surfaces in engagement with each other.

10. An arrangement as defined in claim 3, wherein one of said arms if formed with a cavity having an inner cylindrical peripheral surface portion arranged eccentrically with respect to said axis and the other of said arms is provided with a projection located in said cavity and having an outer cylindrical surface engaging and guided by said inner cylindrical surface to thereby connect said arms for tilting movement relative to each other.

* * * * *